United States Patent

[11] 3,634,099

[72] Inventor Donald C. Wilson
San Jose, Calif.
[21] Appl. No. 878,499
[22] Filed Nov. 20, 1969
[45] Patented Jan. 11, 1972
[73] Assignee FMC Corporation
San Jose, Calif.

[54] CONTROL OF HYDROGEN FORMATION IN POUCHES DURING HEAT TREATMENT
14 Claims, 16 Drawing Figs.
[52] U.S. Cl. .................................................. 99/171 LP,
21/56, 53/22, 53/25, 99/182, 99/214, 156/497,
161/214, 161/216, 161/225
[51] Int. Cl. ..................................................... A23l 3/02,
B65b 55/00, C12h 1/20
[50] Field of Search ............................................ 21/56;
53/22 B, 22 R, 25; 99/171 H, 171 LP, 182, 185,
214; 161/214, 216, 225; 156/497

[56] References Cited
UNITED STATES PATENTS
2,380,134 7/1945 Waters ......................... 99/182
3,132,029 5/1964 Beck ............................ 99/174
3,481,691 12/1969 Trainham ..................... 21/94
3,486,295 12/1969 Rausing et al. ............... 53/89

OTHER REFERENCES
Kirk & Othmer, Encyclopedia of Chemical Technology Vol. 2 (1963), pg. 2

Primary Examiner—John T. Goolkasian
Assistant Examiner—Robert A. Dawson
Attorneys—F. W. Anderson and C. E. Tripp

ABSTRACT: Method of controlling hydrogen formation within laminated pouches each of which includes a layer of aluminum bonded between a layer of polyolefin and a layer of polyester. Water within each pouch diffuses through the plastic inner layer when subjected to a sterilizing temperature and reacts with the aluminum to form aluminum oxide on the contacted surface of the aluminum and hydrogen. The hydrogen diffuses back through the inner pouch film to form a hydrogen rich gas within the pouch. In order to produce a pouch which is sealed prior to heat treatment without a large headspace after sterilization of the product, the aluminum must be deactivated to prevent hydrogen from being formed during the sterilization step. The rate of diffusion of both water and hydrogen may be controlled by varying the thickness of the inner layer of plastic material. The formation of hydrogen during food sterilization is reduced by preheating the laminate to form aluminum oxide on the inner surfaces of the aluminum layer before sterilization of the product filled pouches.

PATENTED JAN 11 1972

FIG_1

FIG_2

FIG_3

FIG_4

INVENTOR.
DONALD G. WILSON

BY J.W. Anderson
C.E. Tripp

ATTORNEYS

FIG_10
FIG_12
FIG_11
FIG_9

FIG_13

FIG_15

FIG_14

FIG_16

CONTROL OF HYDROGEN FORMATION IN POUCHES DURING HEAT TREATMENT

CROSS-REFERENCE TO RELATED APPLICATIONS

The heat treatment of flexible containers or pouches of the type used in the present invention may be performed in accordance with the methods and apparatuses disclosed in my copending applications, Ser. Nos. 693,330; 772,321, now U.S. Pat. No. 3,501,318 which issued on Mar. 17, 1970, and U.S. Pat. No. 3,528,826 which issued on Sept. 15, 1970, respectively; and an application Ser. No. 860,335 filed on Sept. 23, 1969, which applications have been assigned to the assignee of the present application. The present invention is also pertinent to my applications filed on even date herewith and identified by Ser. Nos. 878,503 and 878,504.

1. Field of the Invention

The present invention relates to the art of packaging products in flexible containers, better known as pouches, and more particularly relates to a method for controlling the formation of hydrogen in pouches; and a laminated plastic-foil product made in accordance with the method.

2. Description of the Prior Art

One well-known method of sterilizing flexible containers or pouches that are filled with a product having water added thereto, or included within the product, is to first evacuate and then seal the pouches. The sealed pouches are then sterilized at about 212° to 250° F., depending upon the product in the pouches. During this sterilization with the prior art devices it is essential that the pouches be subjected to an overriding pressure which prevents steam and noncondensible gases generated within the sealed pouches during the cooking operation from causing the pouches to burst.

Another method of sterilizing pouches is to form a one-way valve across the mouth of a filled pouch which allows steam formed in the pouch to purge gases therefrom during sterilization. After sterilization has been completed, the pouch is sealed. This last mentioned method is fully disclosed in my aforementioned copending applications, Ser. Nos. 693,330 and 772,321 now U.S. pat. Nos. 3,501,318 and 3,528,826.

SUMMARY OF THE INVENTION

In accordance with the method of the present invention, it has been discovered that water in pouches filled with water containing food products such as fruits, vegetables, meat, or any combination thereof reacts with certain types of well-known heat sealable laminated pouches having an aluminum layer in each wall. The water reacts with the aluminum to form aluminum oxide on the inner surface of the layer of aluminum in each wall, and to form hydrogen gas which is collected within the pouch. This reaction has no appreciable effect until the pouch is raised to a sterilizing temperature of between about 212° to 250° F. The water first diffuses through the inner plastic layer of each pouch wall to form hydrogen gas, which gas then diffuses through the inner layer and returns to the inside of the pouch. The reaction also forms a protective layer of aluminum oxide on the inner surfaces of the aluminum layers contacted by the water, which formation of aluminum oxide progressively retards further generation of hydrogen. It is also recognized that water diffuses through the outer layer of each wall to cause the formation of aluminum oxide on the outside surfaces of the aluminum, which aluminum oxide acts as a barrier which prevents diffusion of gases therepast. The reaction of water with aluminum is as follows:

$$2Al + 3H_2O = 3H_2 + Al_2O_3$$

Several methods are proposed in order to minimize the formation of hydrogen. The method disclosed and claimed herein is to presoak the aluminum laminate, either before lamination in hot water at 212° F. for 30 to 60 minutes or at a higher temperature for a shorter time; or after lamination in hot water at 250° F. for about 30 to 60 minutes to cause aluminum oxide to form on the inner surfaces in sufficient quantity to inhibit formation of hydrogen to an acceptable degree.

It is also within the scope of the invention to provide a laminated plastic foil or foil product made in accordance with the above method for inhibiting the formation of hydrogen during heat treatment.

BRIEF DESCRIPTION OF THE DRAWINGS

FIG. 6 is a plan of a segment of plastic-aluminum laminated web which is folded in half and has transverse and longitudinal seams preformed therein prior to heat treatment.

DESCRIPTION OF THE PREFERRED EMBODIMENT

When conducting certain tests with commercially available pouches filled with a water containing product, it was determined that a noncondensable gas was formed within the pouches when the pouches were maintained for about 15 minutes at the sterilizing temperature after being sealed. This initial discovery was evidenced by the fact that when headspace measurements were taken immediately after sealing and also after sterilization and cooling, the headspace of plastic-

| Type | Pouches (5" x 7") | | |
|---|---|---|---|
| | Outer layer | Middle layer | Inner layer |
| C-79 (R-2) Continental Can Co. | 0.5 mil polyester | 0.35 mil aluminum foil | 2.5 mil white opaque polyolefin. |
| Dow RZ5511-16 | do | do | 3.5 mil high density polyethylene. |
| X-1084M 3M Company. | 0.9 mil polyester (unoriented). | Vacuum deposited metalized aluminum. | 1.8 mil polyester oriented (heat sealable). | aluminum laminated pouches was greater after sterilization and cooling than it was prior to sterilization.

In order to determine the source of the gas, the type of gas formed, and the quantity of gas formed, additional tests were made using the following three different types of commercially available pouches. The material from which these pouches are made will be termed "plastic-foil laminates" and, as used in the specification and claims, this term shall be considered to include aluminum which is vacuum deposited on the plastic. The three types of pouches are as follows:

In conducting the tests, each pouch was filled with 5 ounces of warm water (140° F.), the headspace volume was reduced by immersing the pouches in cold water to collapse the same, and the pouches were then sealed. This was followed by the first headspace measurement and then the pouches were processed for 15 minutes at 212° F. After cooling the pouches to room temperature, the second headspace measurement was made. The pouches were then heat processed at 250° F. for 30 minutes, cooled to room temperature, and the headspace volume was measured for the third time. The heat processing media was water subjected to an overriding air pressure.

Other pouches were processed as above described except that they were sealed when empty.

Samples were taken of the gas from the pouch headspace volume and was analyzed with the results listed below in tables 1, 2 and 3 which indicate the average of the measurements made on 6 pouches.

TABLE 1

| | Average headspace volumes | | |
|---|---|---|---|
| | Before 212° F. Cook, cc. | After 212° F. Cook, cc. | After 250° F. Cook, cc. |
| Film type: | | | |
| C-79 | 0.4 | 0.4 | 6.1 |
| Dow | 0.6 | 1.1 | 2.5 |
| X-1084M | 0.7 | 1.4 | 2.1 |

TABLE 2

| | Average increase of headspace volumes | |
|---|---|---|
| | During 212° F. Cook, cc. | During 250° F. Cook, cc. |
| Film type: | | |
| C-79 | +0.0±0.2 | +5.7±0.2 |
| Dow | +0.5±0.4 | +1.4±0.4 |
| X-1084M | +0.7±0.5 | +0.7±0.3 |

TABLE 3

| | Gas analysis of headspace after 250° F. Cook, percent | | | |
|---|---|---|---|---|
| | $H_2$ | $N_2$ | $O_2$ | $CO_2$ |
| Film type: | | | | |
| C-79 | 89.0 | 8.5 | 2.3 | 0.2 |
| Dow | 65.0 | 30.0 | 4.7 | 0.2 |
| X-1084M | 0.0 | 86.0 | 14.0 | 0.3 |

The first measurement of headspace, "Before 212° F. Cook", of the sealed pouch was the quantity of air trapped in the pouches after a 5 second submergence in cold water. The second headspace measurement, "After 212° F. Cook", was the combined amount of trapped air, dissolved incondensable gases which have been forced into the gas phase at moderate temperatures, and possibly minute amounts of incondensable gases that have been generated within the pouch due to chemical breakdown. The last measurement, "After 250° F. Cook", includes the previously mentioned volumes, the additional discovered incondensable gas volumes that have been liberated at high temperatures and the majority of gases which are derived from chemical breakdown.

There was carbon dioxide in each analysis which may have been introduced by the method used in obtaining samples. The incondensable gases of the pouch were in contact with tap water when they were transferred from the pouches.

The experimental data shows that the major, if not all, condensable gas that was generated in the pouches during heat processing was hydrogen. The C-79 pouches, which have the largest increase in headspace volume of the pouches tested, had the highest percent of hydrogen in its chromatographic analysis. The pouches made of X-1084M film were the other extreme where there was no hydrogen present in the analysis and the headspace volume increase was the smallest.

The two possible sources of the generated hydrogen were the breakdown of water in the pouch or a reaction involving the laminate film. However, water breakdown in the absence of aluminum was not considered the source of hydrogen because there was no large quantities of oxygen present when the hydrogen level was appreciable. The oxygen present was attributed to air due to the nitrogen-oxygen ratio in the analysis. In view of the above it was determined that the hydrogen must therefore be coming from the film. The pouches that were processed with no contents (no water fill) formed negligible amounts of incondensable gas. This indicates that water must be present for the hydrogen generation which would further indicate the aluminum foil as one of the reactants.

Another factor which influenced the amount of headspace volume measured in the pouches was the diffusion rate of hydrogen through the pouch films. When the volumes were measured, an incondensable gas hydrogen "$H_2$" with a high diffusion rate was not anticipated and the time intervals between heat processing and gas measurement and analysis were not controlled. Therefore, it was believed possible that the metallized film, X-1084M, which showed no hydrogen when analyzed, may have generated hydrogen, as the other films have during heat processing, but that the diffusion rate of hydrogen through the pouch was so large, because of many pin holes in the thin layer of aluminum, that no significant amount of hydrogen remained when the analysis sample was taken. The headspace volumes of the C-79 pouches were measured after a weeks storage and were found to have lost approximately 1 cubic centimeter of volume.

Additional tests were made in order to support the belief that hydrogen was generated by the X-1084M pouches but diffused through the walls thereof prior to taking gas measurements. Also, tests were made to determine whether an aluminum layer disposed between two plastic layers would be attacked by water inside or outside the pouches when heated to 250° F.

In one of these tests the X-1084M pouches were filled with water and were heated to 250° F. for 6 hours. These pouches were so badly attacked by water that more than half of each pouch became transparent indicating a total loss of aluminum.

In order to determine whether high temperatures were required for the reaction to take place, Dow pouches were filled and sealed with water. Some of these pouches were heat treated at 250° F. and others were not heat treated. The inner polyethylene layer was stripped away from the aluminum layer after heat treatment and it was noted that the exposed aluminum surface of the heated pouches had a dull oxidized looking surface whereas the exposed aluminum surface of the pouches that were not heated was shiny. These pouches were then exposed to atmosphere for 1 week with no change in the appearance of the two pieces of foil being noted. Thus, this test indicated that heat and water was necessary to cause the reaction to occur.

Tests were also made which substantiate the fact that the amount of gas formed increased with time at 250° F. but that the rate of gas production decreases with time. These tests substantiate the fact that the gradual formation of aluminum oxide on the contacted surface of the aluminum inhibits further formation of hydrogen.

Several methods and apparatus have been developed to inhibit the formation of hydrogen during heat treatment.

In accordance with a first embodiment of the invention, a heat treatment apparatus 20 (FIGS. 1 to 5) is provided for treating webs of laminated material either prior to formation into pouches P (FIG. 8) as indicated by the web W (FIG. 7) or after pouches have been partially formed in the web as indicated by the folded web W' (FIG. 6). The apparatus 20 is in the form of a single leg hydrostatic cooker and includes an inlet hydrostatic chamber or leg 22 (FIG. 1), a steam chamber 24, and an outlet hydrostatic leg 25 all communicating with each other through a trough 26 at their lower ends. The apparatus 20 includes two parallel sidewalls 28 (only one wall being shown in FIG. 1) two vertical walls 30 and 32, and a roof 34 which are secured to each other and to the sidewalls 28 to define the steam chamber 24. The inlet hydrostatic chamber 22 is defined by the end walls 28, the sidewall 30, another sidewall 36, and a floor 38 all of which are interconnected as illustrated. Likewise, the outlet hydrostatic leg 25 is defined by the end walls 28, the sidewall 32, the floor 38, and another sidewall 40. The trough is defined by the floor 38 and the four walls 28, 36 and 40 which are connected to each other in fluid tight relationship.

Figure 1:
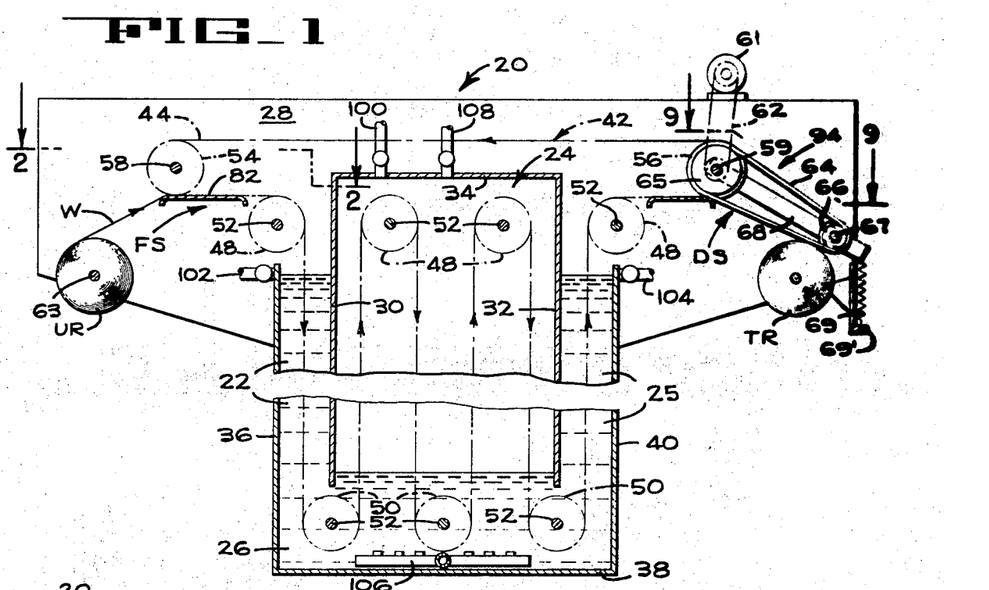
FIG. 1 is a diagrammatic central vertical section of a single, leg hydrostatic cooker of a first embodiment of the present invention which is arranged to handle a web of plastic-aluminum laminate and to form a gas inhibiting aluminum oxide coating on the surface of the aluminum.
Figures 2, 3, 4:
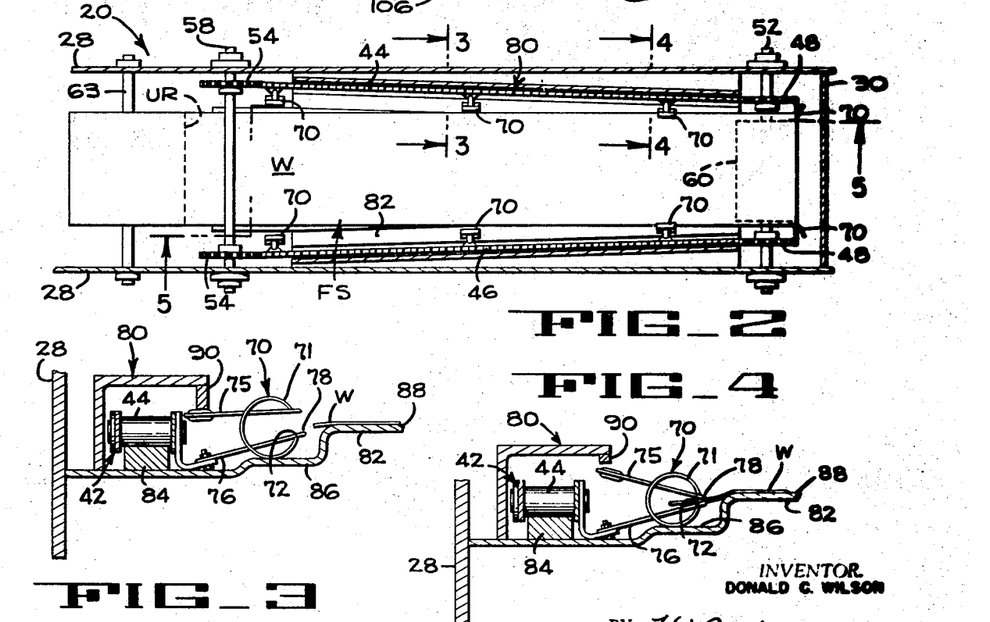
FIG. 2 is an enlarged horizontal section taken along lines 2—2 of FIG. 1.
FIG. 3 is an enlarged vertical section taken along lines 3—3 of FIG. 2 illustrating an open web-engaging clip.
FIG. 4 is a section taken along lines 4—4 of FIG. 2 illustrating the clips in a closed position in gripping engagement with the web.

An endless conveyor 42 (FIGS. 1 to 4) comprises two spaced endless chains 44 and 46 which are trained around a plurality of upper pairs of sprockets 48 and lower sprockets 50 which are keyed to shafts 52 journaled in the walls 28 and are spaced equal distances apart. The chains are also trained around pairs of web feeding sprockets 54 and web discharging sprockets 56 which are journaled on shafts 58 and 59, respectively and are spaced apart distances greater than the spacing between the pairs of sprockets 48 and 50 as illustrated in FIG. 2. Web supporting rollers 60 (FIGS. 2 and 5) are also keyed to the shafts 52. The conveyor 42 is continuously driven by motor 61 and a chain drive 62.

An untreated roll UR of plastic-foil laminate to be processed is journaled on a shaft 63 at the input end of the apparatus 20 adjacent a feed station FS, and a similar treated roll TR is disposed adjacent a discharge station DS and receives the web W of plastic-foil laminate after it has been treated. The roll TR is driven by several belts 64 (FIGS. 1 and 9) trained around rollers 65 keyed to the shaft 59 and rollers 66 keyed to the shaft 67 journaled in one end of a frame 68 that has its other end pivoted to the shaft 59. A spring 69 connected between the frame 68 and a bracket 69', which bracket is secured to the walls 28, resiliently urges the belt in driving engagement with the roll TR.

As illustrated in FIGS. 2 to 4, a plurality of web gripping spring clips 70 are provided to connect the web to the conveyor 42. Each spring clip includes a generally cylindrical metal spring 71 (FIG. 3) which is axially severed at 72 and has two slots therein. A pair of spaced arms 75 and 76 extend through the slots and project outwardly through the severed area to define a pair of spring loaded jaws 78 which grip the web W. The arm 76 is bolted to its associated chain 44 or 46 as indicated in FIG. 3.

A feed mechanism 80 (FIGS. 2 to 4) is provided to attach the web W to the conveyor 42 and comprises a support plate 82 which is secured to the walls 28. The support plate 82 includes chain guiding sections 84 for each chain, spring clip guiding sections 86 which support the clips 70 attached to each chain, and a web guiding section 88 for supporting the web W. As illustrated in FIG. 2, the support plate 82 is disposed below a converging portion of the conveyor 42 at the feed station FS and accordingly the sections 84, 86 and 88 are likewise converging sections. The spring clips 70 on each chain are opened by a stationary cam bar 90 (FIGS. 3 and 4) which engages and moves the upper arm 75 of each spring clip 70 downwardly as the clip enters the feed station as shown in FIG. 3. The cam bars 90 are shaped so as to release the arms 75 thereby permitting the spring clips to grip the web W as the web moves out of the feed station FS as illustrated in FIG. 4.

It will be understood that a discharge mechanism 94 (FIG. 1) is disposed at the discharge station DS and operates on the same principle as the feed mechanism 80 except that the sections of the equivalent supporting plate at the discharge station DS diverge rather than converge.

Figures 5, 7, 8, 9:
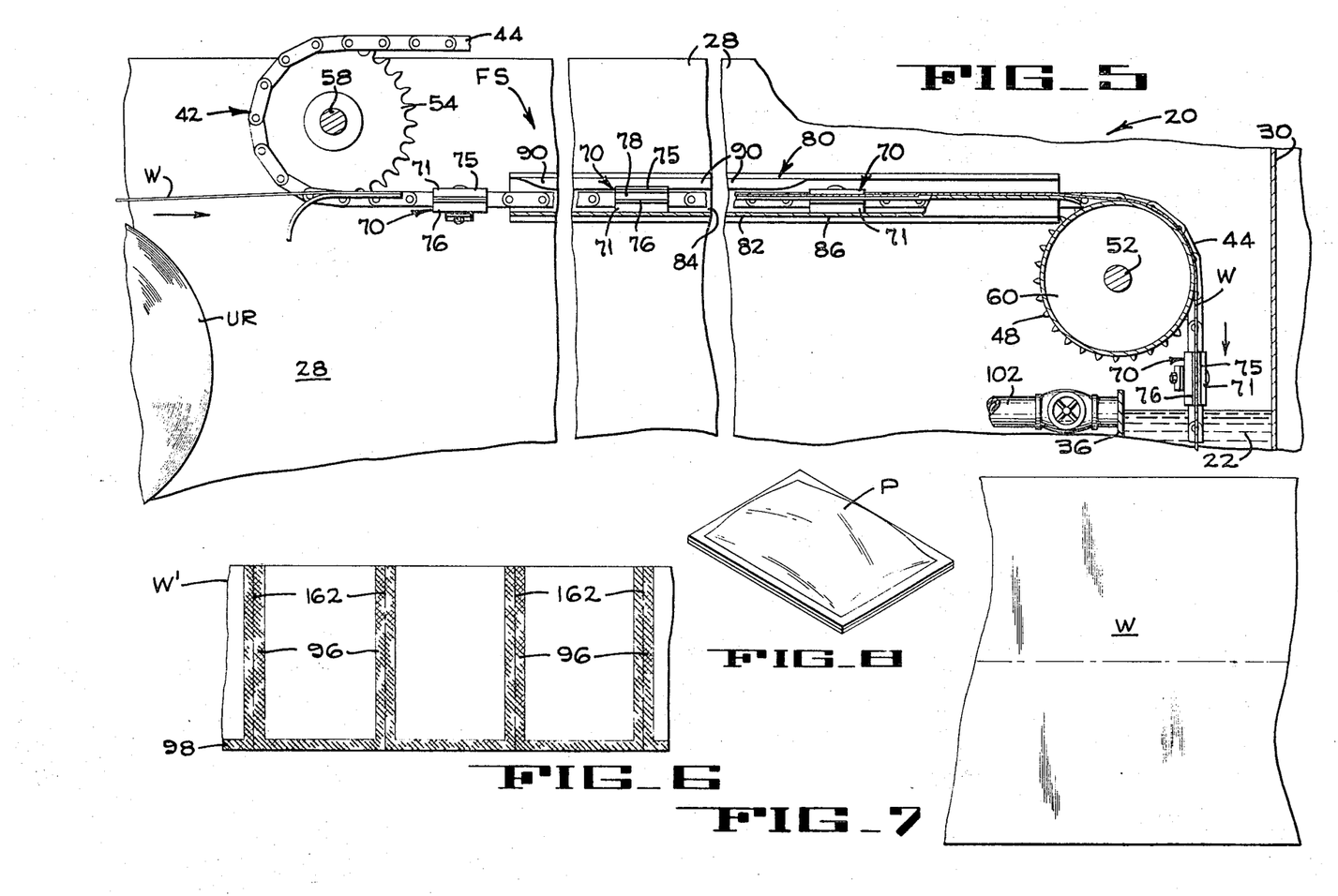
FIG. 5 is an enlarged vertical section taken along lines 5—5 of FIG. 2.
FIG. 7 is a plan of a segment of plastic-aluminum laminated web which is of full width single thickness and is to be folded at its midpoint to form pouches from one folded sheet of laminate.
FIG. 8 is a perspective of a filled and sealed pouch formed in accordance with the present invention.
FIG. 9 is an enlarged section taken along lines 9—9 of FIG. 1.

Although the apparatus 20 is illustrated as being adapted to handle one web W, it will of course be understood that the apparatus may be made much wider so as to handle several webs simultaneously. It will also be understood that the web may be folded in half as indicated by the web W' (FIG. 6) and may have transverse seams or sealed areas 96 and longitudinal seams or sealed areas 98 formed therein prior to the heat treatment as illustrated in FIG. 6, or may be passed through the apparatus 20 while in its full width prior to any sealing operations being performed thereon as illustrated in FIG. 7.

Steam is directed into the steam chamber 24 through a thermostatically controlled valved conduit 100 (FIG. 1) at temperatures of about 250° F. and a pressure of about 15 p.s.i. gauge. Water is introduced into the inlet hydrostatic leg 22 and into the outlet hydrostatic leg 25 by valved conduits 102 and 104, respectively, and is maintained at a height which balances the pressure of steam within the steam chamber 24. The water in the trough 26 and in the hydrostatic legs are maintained at a temperature somewhat below boiling by steam from a valved and thermostatically controlled steam manifold 106.

During operation of the heat treatment apparatus 20, the leading edge of a web W of laminated plastic foil is received from the untreated roll UR and is clamped to the conveyor by spring clip 70 on the two chains 44 and 46. The conveyor 42 is driven continuously at a speed which will cause the web to remain in the heat treatment mediums in the several chambers of the heat treatment apparatus for about 30 to 60 minutes, preferably about 45 minutes which is sufficient to provide aluminum oxide layers having a thickness in excess of about 0.01 mils and preferably about 0.02 mils on both surfaces of the aluminum. As the web W is withdrawn from the roll UR it will automatically be clamped to the conveyor 42 by the spring clips 70 which may be spaced along the conveyor 42 at intervals of about 5 feet. While the web W is being moved through the hot water and steam, water diffuses through both plastic layers of the web and reacts with the adjacent surfaces of the aluminum to form aluminum oxide which coats the aluminum surfaces, and hydrogen which diffuses out of the plastic layers and is released into the water. The hydrogen may be bled from the steam chamber 24 through a valved conduit 108.

The processed web W is then passed through the discharge station DS at which time the spring clips 70 are opened thereby releasing the web from the conveyor 42. The processed web W is then rewound upon the roll TR thereby providing a supply of oxidized plastic-foil laminate which is subsequently formed into individual pouches P.

Figures 9, 10, 11, 12:
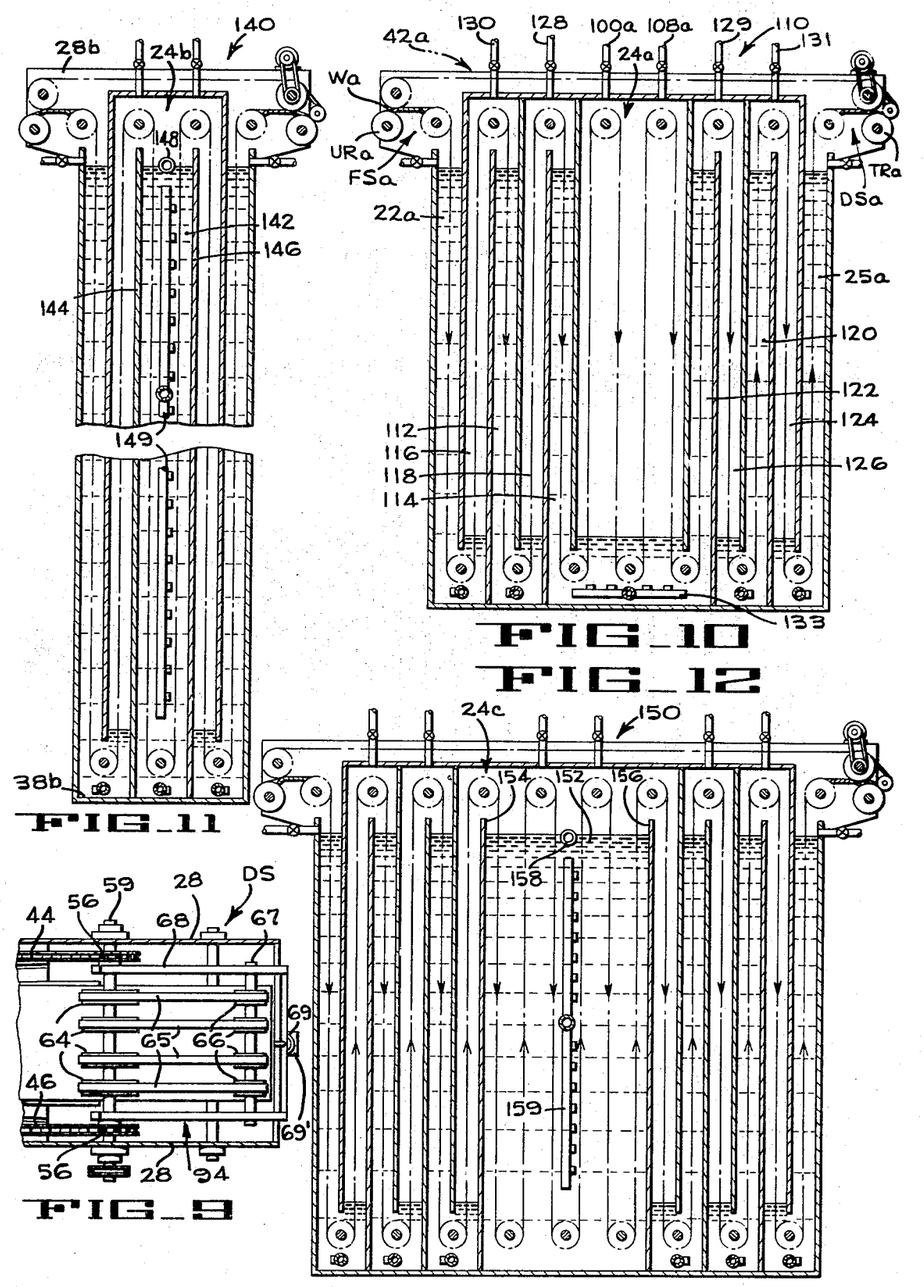
FIG. 10 is a diagrammatic vertical section of multileg hydrostatic cooker of a second embodiment of the invention.
FIG. 11 is a diagrammatic vertical section of a single-leg hydrostatic cooker of a third embodiment of the invention featuring a high pressure water treatment chamber.
FIG. 12 is a diagrammatic vertical section of a multileg hydrostatic cooker of a fourth embodiment of the invention featuring a high pressure water treatment chamber.

A second embodiment of the heat treatment apparatus 110 for oxidizing the aluminum foil in a laminated web of pouch forming material is diagrammatically illustrated in FIG. 10. Since the apparatus 110 is substantially the same as the apparatus 20 of the first embodiment of the invention, only the differences will be described in detail. Parts of the apparatus 110 which are similar to those of the apparatus 20 will be assigned the same numerals followed by the letter "a".

The apparatus 110 is in the form of a multileg hydrostatic cooker having a steam chamber 24a, a first inlet leg 22a, a second inlet leg 112 and a third inlet leg 114. The three inlet legs cooperate to support unbalanced columns of water which when added together are sufficient to balance the pressure within the steam chamber 24a. Intermediate gas filled inlet chambers 116 and 118 are disposed between the water in the inlet leg 22a and the water in the second inlet leg 112; and between the water in the second inlet leg 112 and the water in the third inlet leg 114, respectively. Similarly, the apparatus 110 includes a first outlet leg 25a, a second outlet leg 120 and a third outlet leg 122. The three outlet legs cooperate to support unbalanced columns of water which when added together are of sufficient height to balance the pressure within the steam chamber 24a. Intermediate gas filled outlet chambers 124 and 126 are disposed between the water in the first outlet leg 25a and the water in the second outlet leg 120; and between the water in the second outlet leg 120 and the column of water in the third outlet leg 122, respectively. If steam at 250° F. and 15 p.s.i. is the primary heating medium and is directed into the steam chamber 24a through a valved conduit 100a, a balancing pressure of 10 p.s.i.g. is required in the gas chambers 118 and 126; and a pressure of 5 p.s.i.g. is required in the gas chambers 116 and 124. Although air at the appropriate pressure may be directed into these chambers, it is preferred that steam at about 240° F. and 10 p.s.i.g. be directed into the gas chambers 118 and 126 from valved conduits 128 and 129; and that steam at about 228° F. and 5 p.s.i.g. be directed into the gas chambers 116 and 124 through valved conduits 130 and 131. Gases may be purged from the steam chamber 24a at periodic intervals through a valved conduit 108a. The water is heated by steam from thermostatically controlled steam manifolds 133.

A conveyor 42a receives the web Wa to be processed from a roll URa at a feed station FSa and advances the web through the several chambers of the heat treatment apparatus 110 in the direction indicated by the arrows. After a treatment of between about 30 to 60 minutes, the processed web is released from the conveyor 42a at the discharge station DSa and is wound on the discharge roll TRa for future use in forming pouches.

The oxidation of the aluminum foil within the laminate may also take place primarily in water at 250° F. in a heat treatment apparatus 140 of a third embodiment of the invention as diagrammatically illustrated in FIG. 11. The apparatus 140 is identical in construction and in operation to the apparatus 20 with the exception that a hot water tank 142 is formed within the steam chamber 24b by walls 144 and 146 which are sealed to the sidewalls 28b and the floor 38b. The tank 142 is filled with water from a valved conduit 148 and the water is heated by steam from a valved thermostatically controlled manifold 149.

In FIG. 12, a fourth heat treatment apparatus 150 is disclosed which is identical to the apparatus disclosed in FIG. 10 with the exception that a water tank 152 is formed in the steam chamber 24c by walls 154 and 156. The tank 152 is filled with water from a valved conduit 158 and is heated by steam from a valved and thermostatically controlled manifold 159 to about 250° F.

It will also be understood that individual pouches that have been severed along lines 162 (FIG. 6) from the web W' may also be processed by any one of the above apparatus by merely providing additional spring clips 70 and manually feeding the individual pouches into gripping engagement with the clips at the feed station, and after the pouches have been processed manually removing the pouches at the discharge station.

Figures 13, 14, 15:
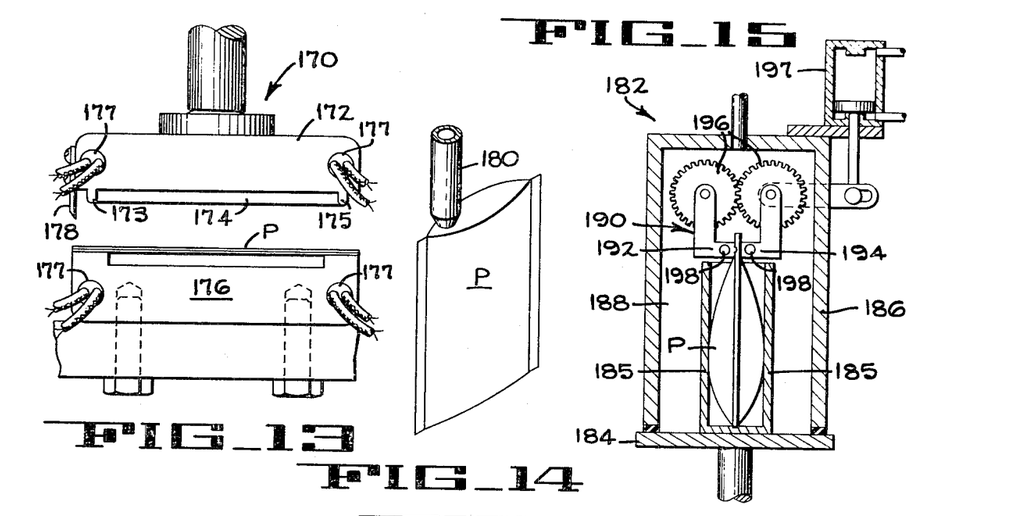
FIG. 13 is a diagrammatic elevation of a device for forming an open mouth pouch.
FIG. 14 is a diagrammatic perspective of a device for filling a pouch.
FIG. 15 is a diagrammatic section of an apparatus for evacuating and sealing the mouth of the pouch prior to sterilization.

After the plastic-aluminum foil laminate is preheated to form a layer of aluminum oxide on each surface of the aluminum layer, which oxide is about 0.02 mils thick, the preheated laminate is formed into an open mouth pouch P by a seaming mechanism 170 (FIG. 13). The seaming mechanism 170 is fully disclosed in my copending application, Ser. No. 878,503. In general, the mechanism 170 includes a sealing head 172 having sharply curved sealing bars 173, 174 and 175 which communicate with each other. An anvil 176 is disposed below the sealing head 172 and both the anvil and head are heated by electrical coils 177 to a bonding temperature of about 150° to 325° F. A sealing pressure of about 7–20 pounds per linear inch of steam is then applied for between about 2 to 6 seconds. A knife 178 is provided to sever each pouch from the web.

After the pouch P is formed, the pouch is filled with a water containing food product by any suitable filling device 180 such as that diagrammatically illustrated in FIG. 14. The filled pouch P is then evacuated and sealed by any suitable apparatus 182 (FIG. 15) such as that disclosed in Grafingholt U.S. Pat. No. 2,966,019. As diagrammatically illustrated in FIG. 15, the apparatus 182 comprises a vertically movable table 184 which includes pouch supporting walls 185 within which the filled pouch P is positioned. The table 184 and pouch are then moved upwardly into sealing engagement with the lower end of a housing 186 that defines a vacuum chamber 188 that is evacuated by a conduit connected to a vacuum pump (not shown). After the pouch P has been evacuated, the open mouth is sealed by a sealing mechanism 190 which as diagrammatically illustrated includes two pivotally mounted sealing jaws 192 and 194 which are connected together by pinions 196 and are urged between the illustrated sealing position and an open position by a hydraulic cylinder 197. The jaws are heated to about 250° to 325° F. by electrical heating elements 198 and apply a sealing pressure to the pouch P of about 7–20 pounds per linear inch for between about 2 to 6 seconds thus hermetically sealing the pouch P.

Figure 16:
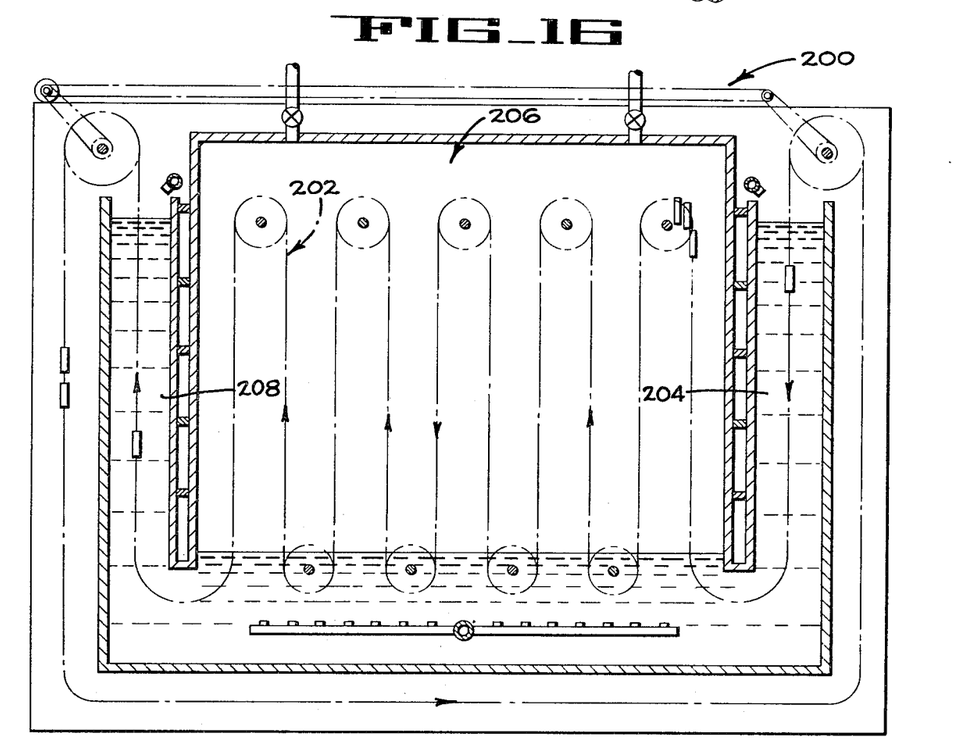
FIG. 16 is a diagrammatic vertical central section of an apparatus for sterilizing the product sealed in the pouch.

The filled and sealed pouch P is then sterilized by any suitable cooking apparatus. For example, the filled and sealed pouches may be sterilized in a hydrostatic cooker 200 (FIG. 16) of the type disclosed in my copending application, Ser. No. 878,503. In general, the cooker 200 includes and endless conveyor 202 to which the pouches are attached and which conveys the pouches progressively through an inlet hydrostatic leg 204, a sterilizing chamber 206, and a discharge hydrostatic leg 208. The inlet leg 204 is filled with heated water, the discharging leg 208 is filled with cooling water, and the sterilizing chamber 206 is filled with steam maintained at between about 212° and 250° F.

During sterilization, the formation of hydrogen is prevented, or minimized to such an extent that only insignificant amounts of hydrogen is formed by the layers of aluminum oxide that have previously been formed on the inside surfaces of the aluminum on the two walls of the pouch P. Thus, the filled, evacuated and sealed pouch may be sterilized without requiring any overriding pressure.

From the foregoing description it is apparent that the present invention discloses a method for controlling the formation of hydrogen within laminated plastic-aluminum foil pouches during heat treatment of the pouches. The formation of hydrogen is inhibited by preheating the laminated material in water or steam for a period sufficient to form aluminum oxide on the surfaces of the aluminum, which oxide inhibits the further formation of hydrogen.

Although the best mode contemplated for carrying out the present invention has been herein shown and described, it will be apparent that modification and variation may be made without departing from what is regard to be the subject matter of the invention.

What I claim is:

1. A method of packaging water containing food products or the like in pouches of a plastic-foil laminate having a central aluminum layer laminated to an outer protective plastic layer and an inner heat sealable plastic layer comprising the steps of subjecting the laminate to an aqueous heat treatment preheated medium maintained at a temperature above 212° F., maintaining the laminate within said preheating medium for a sufficient period to allow water to diffuse through the plastic layers, causing said diffusing water to react with the aluminum forming hydrogen which escapes from the laminate by diffusing out of the plastic layers and which also forms aluminum oxide on the inner and outer surfaces of said foil, continuing the application of said preheating medium until a layer of aluminum oxide of at least about 0.01 mils in thickness is formed on the inner aluminum surface to inhibit the further formation of hydrogen at a sterilization temperature, forming the preheated laminate into an open mouth pouch, thereafter filling the pouch with a water containing product, evacuating air from the headspace of the pouch, sealing the mouth of the filled pouch, and heating the filled pouch to the sterilization temperature for a period sufficient to sterilize the water containing product therein.

2. A method of packaging water containing food products or the like into pouches comprising the steps of preheating a plastic-foil laminate having a central aluminum layer laminated to an outer protective plastic layer and an inner heat sealable plastic layer by subjecting the laminate to an aqueous heat treatment medium maintained at a temperature above 212° for a sufficient period to allow water to diffuse through the plastic layers to react with the aluminum foil and form hydrogen which diffuses out of the plastic layers and also form aluminum oxide on the inner and outer surfaces of said foil in sufficient quantities to inhibit the further formation of hydrogen at a sterilization temperature, forming the preheated laminate into an open mouth pouch, filling the pouch with a water containing product, evacuating air from the headspace of the pouch, sealing the mouth of the pouch, and heating the pouch to the sterilization temperature for a sufficient period to sterilize the water containing product therein, said plastic-foil laminate being preheated to a temperature of about 250° F. for a period in excess of about 30 to 60 minutes.

3. A method of controlling the formation of hydrogen according to claim 2 wherein the sterilization temperature is between about 212° to 250° F.

4. A method of controlling the formation of hydrogen according to claim 1 wherein the plastic-foil laminate is in the form of a web and is received from a supply roll, and additionally including the steps of gripping the plastic-foil laminate, and moving the laminate continuously through said aqueous heat treatment medium.

5. A method of controlling the formation of hydrogen according to claim 4 wherein the plastic-foil laminate is in the form of a web folded in half and having a plurality of transverse seal line and a longitudinal seal line formed therein to preform a series of interconnected pouch blanks.

6. A method of controlling the formation of hydrogen according to claim 4 wherein the plastic-foil laminate is moved along a vertical zigzag path through columns of hot water separated by columns of gases wherein the pressure of the water and the gas columns progressively increase from atmospheric pressure to a preheating pressure of about 15 p.s.i.g. and thereafter progressively reduce in pressure to atmospheric pressure.

7. A method of controlling the formation of hydrogen according to claim 6 wherein said gas columns are composed primarily of steam.

8. A method of controlling the formation of hydrogen according to claim 6 wherein a single hot water column is disposed between each of the atmospheric pressure areas and the preheating pressure area.

9. A method of controlling the formation of hydrogen according to claim 6 wherein a plurality of water columns are disposed between each of the atmospheric pressure areas and the preheating pressure area.

10. A method according to claim 6 wherein steam is the heat treatment medium that is maintained at the preheating pressure and temperature.

11. A method according to claim 6 wherein hot water is the primary heat treatment medium that is maintained at the preheating pressure and temperature.

12. A method of treating a plastic-aluminum laminate having a central aluminum layer laminated to an outer protective plastic layer and an inner heat sealable plastic layer, comprising steps of subjecting the laminate to an aqueous heat treatment medium maintained at a temperature above 212° F., maintaining the laminate within aid heat treatment medium for a sufficient period to cause water to diffuse through both plastic layers, continuing the application of said aqueous heat treatment medium until the aqueous medium reacts with the aluminum to form hydrogen and a layer of aluminum oxide on one surface of the aluminum which is at least about 0.01 mils in thickness to inhibit further formation of hydrogen from that surface, and releasing the hydrogen formed by the aqueous heat treatment medium from confinement by the laminate by diffusion out of the plastic layer and dispersion away from the laminate.

13. A method according to claim 12 wherein the plastic-aluminum laminate is heated to a temperature of about 250° F. for a period of about 30 to 60 minutes.

14. A method according to claim 12 wherein the plastic-aluminum laminate is in the form of an elongated web, and additionally including the steps of gripping the plastic-aluminum laminate, and moving the laminate continuously through said aqueous heat treatment medium.

* * * * *

PO-1050
(5/69)

UNITED STATES PATENT OFFICE
CERTIFICATE OF CORRECTION

Patent No. 3,634,099      Dated January 11, 1972

Inventor(s) DONALD C. WILSON

It is certified that error appears in the above-identified patent and that said Letters Patent are hereby corrected as shown below:

Column 4, line 33 - Change "measured" to --remeasured--.

Column 7, line 41 - Change "heated" to --treated--.

Column 7, line 50 - Change "150°" to --250°--.

Signed and sealed this 1st day of August 1972.

(SEAL)
Attest:

EDWARD M. FLETCHER, JR.      ROBERT GOTTSCHALK
Attesting Officer              Commissioner of Patents